Figure 1:
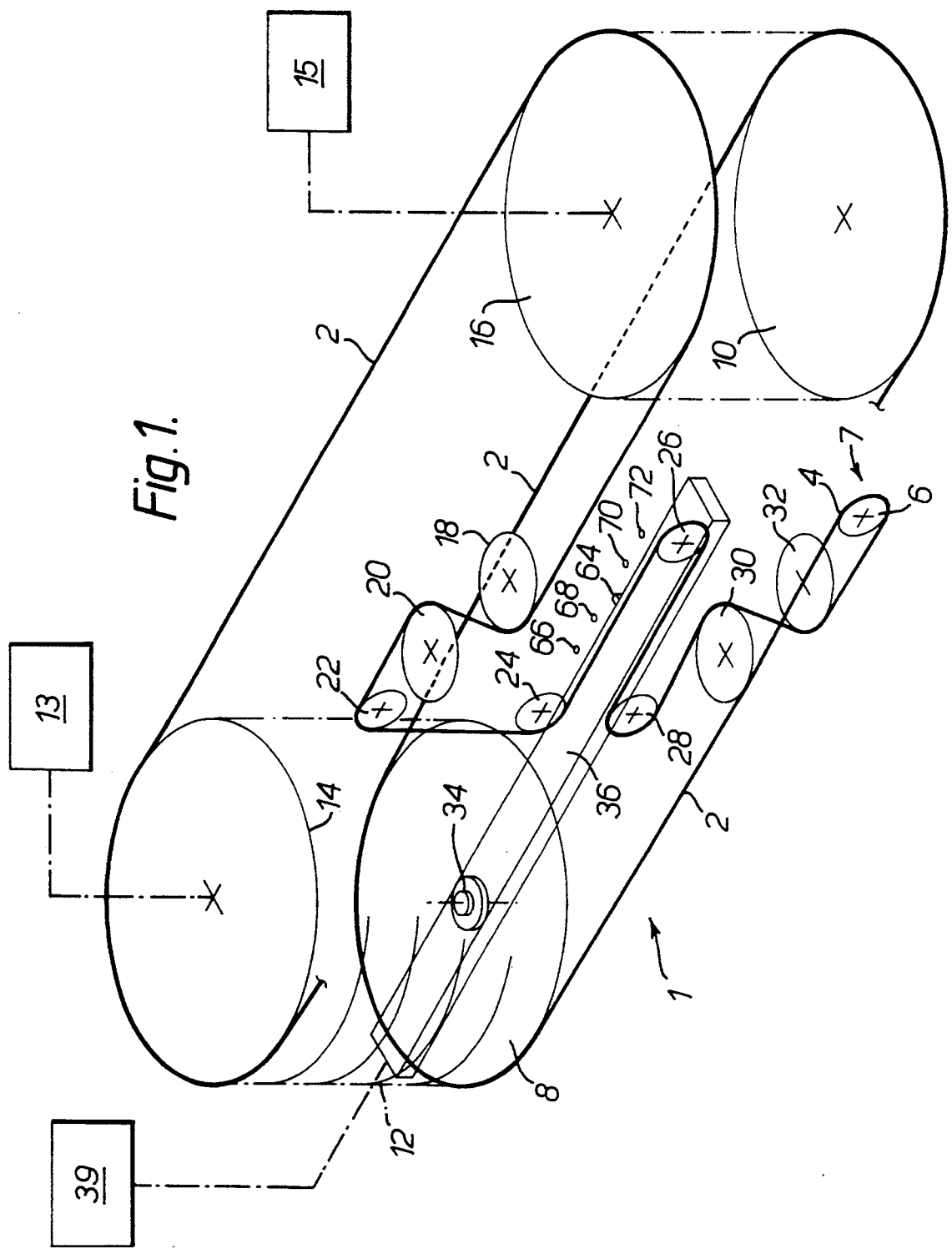

United States Patent [19]

Brown et al.

[11] Patent Number: 5,361,888
[45] Date of Patent: Nov. 8, 1994

[54] CONVEYOR SYSTEM FOR ROD-LIKE ARTICLES

[75] Inventors: Anthony R. Brown; Allen F. Griffiths; Robert H. Taylor, all of Bucks, England

[73] Assignee: Molins plc, Milton Keynes, United Kingdom

[21] Appl. No.: 10,395

[22] Filed: Jan. 28, 1993

[30] Foreign Application Priority Data

Feb. 1, 1992 [GB] United Kingdom ............. 9202189.8

[51] Int. Cl.⁵ .............................................. B65G 1/00
[52] U.S. Cl. .................... 198/347.3; 198/778
[58] Field of Search ............... 198/778, 347.3, 792, 198/588, 594

[56] References Cited

U.S. PATENT DOCUMENTS

| | | | |
|---|---|---|---|
| 3,750,859 | 8/1973 | Smith | 198/778 |
| 3,976,190 | 8/1976 | Schmermund | 198/347.3 |
| 4,254,858 | 3/1981 | Seragnoli | 198/347.3 |
| 4,299,322 | 11/1981 | Greenhead et al. | 198/347.3 |
| 4,339,025 | 7/1982 | McCombie | 198/347.3 |
| 4,349,096 | 9/1982 | Thamerus | 198/347.3 |
| 4,429,779 | 2/1984 | Hinchcliffe | 198/347.3 |
| 4,653,631 | 3/1987 | Heybourn et al. | 198/347.3 X |
| 4,872,543 | 10/1989 | Hinchcliffe | 198/347.3 |

Primary Examiner—D. Glenn Dayoan
Attorney, Agent, or Firm—Antonelli, Terry, Stout & Kraus

[57] ABSTRACT

A reversible reservoir for cigarettes or filters includes relatively small and relatively large capacity sections arranged in series with a drive for driving these sections at different rates. The small section is preferably arranged adjacent the reservoir inlet and is capable of buffering the main part of the reservoir so that the latter is not required to undergo high accelerations. The reservoir may be in the form of an elongated helix with an endless conveyor (2;102) passing around spaced columns of wheels (8, 10, 12, 14, 16; 108, 112, 114), one of the lowermost wheels (8;108) being bodily movable so as to be capable of imposing an additional velocity on the section of conveyor adjacent the reservoir inlet (7;107). The movable wheel is carried on a (36;136) which also carries a pulley (26;126) for the conveyer return run. Tensioning (42–50;142–150) for the conveyor is provided by arranging for the position of the pulley (26;126) to be adjustable relative to the beam (36;136).

22 Claims, 3 Drawing Sheets

CONVEYOR SYSTEM FOR ROD-LIKE ARTICLES

This invention relates to a conveyor system for rod-like articles, particularly for cigarettes or similar articles in multi-layer stack formation.

In the manufacture of rod-like articles such as cigarettes or cigarette filter rods it is known to provide a conveyor system for conveying the articles in multi-layer stack formation between a delivery device such as a cigarette making machine and a receiving device such as a cigarette packing machine. It is also known to incorporate in such a conveyor system a buffer reservoir device arranged to receive surplus articles when the output of the delivery device exceeds the requirements of the receiving device and to supply articles when the output of the delivery device is less than the requirements of the receiving device. Examples of such reservoir devices, in which the articles are stored as a substantially continuous stream of articles in multi-layer stack formation are disclosed in British patent specifications Nos. 1299174 and 2133759.

As speeds of delivery and receiving devices have increased and it has become more common to link several delivery and receiving devices together, the potential demands on any reservoir device have increased, particularly with regard to its ability to accelerate from rest or low speed up to a high speed so as to rapidly respond in the event that the system balance suddenly changes (e.g. if a delivery device or a receiving device stops). As speeds have increased the requirements in terms of maximum size of reservoir device have also tended to increase, so that in the cigarette industry, where delivery devices having speeds of 10,000 cigarettes/minute are relatively common, reservoir devices require a maximum capacity of several tens of thousands of cigarettes. Such reservoirs, because of their size, are not well adapted to undergo accelerations sufficient to ensure that one device may continue to operate at full speed when a linked device fails. Consequently it has been proposed to provide, in conjunction with a relatively large capacity reservoir, a smaller reservoir which can respond to short term variations in the balance in a system, with the larger reservoir responding to longer term variations. Said specification No. 2133759 discloses one form of reservoir arrangement of this type.

According to the present invention a conveyor system for rod-like articles in multi-layer stack formation comprises a reversible reservoir having first and second variable capacity sections arranged in series, conveyor means for conveying articles in each of said sections, and means for driving said conveyor means at different rates in said first and second sections. Preferably the first section is of relatively small capacity and is capable of relatively high accelerations and the second section is correspondingly of relatively large capacity and capable of lower maximum acceleration. The conveyor means may extend continuously through said first and second sections. In such case the driving means may comprise a first means for driving the conveyor through the first and second sections, and a second means for imposing a supplementary drive in the first section. In a preferred construction the conveyor means extends around a plurality of guide means, e.g. rotatable wheels, at least one of which is movable to vary the capacity of at least the first section of the reservoir.

According to another aspect of the invention a conveyor system for rod-like articles includes means defining a path for said articles in multi-layer stack formation, a first variable capacity reservoir of relatively small capacity, a second variable capacity reservoir of relatively large capacity, said reservoirs being arranged so as to receive articles from or deliver articles to said path, and means for controlling transfer of articles to or from said reservoirs, said controlling means being arranged so that said first reservoir is capable of operation alone or prior to the second reservoir, whereby demands on operation of the second reservoir may be reduced, wherein the first and second reservoirs are arranged in series. In a preferred arrangement the system includes a junction at which said path communicates with a first end of said first reservoir, the other end of said reservoir communicating with said second reservoir. Preferably each of the first and second reservoirs is of variable length. Each may also include conveyor means, means being provided for driving said respective conveyor means at different speeds. Common conveyor means may extend through the first and second reservoirs, means being provided for moving the conveyor at different rates in the first and second reservoirs.

According to a further aspect of the invention a conveyor system for rod-like articles includes a variable capacity reservoir having endless conveyor means for supporting a stream of rod-like articles in multi-layer stack formation, a plurality of spaced guide means defining a path of said conveyor means on which articles may be supported, and means for moving at least one of said guide means to move the conveyor on part of said path without moving it on another part of said path. The movable guide means may comprise a wheel around which the conveyor passes, the moving means being arranged to move the wheel in a direction transverse to its axis. Preferably there are two horizontally spaced columns of vertically spaced wheels, the endless conveyor means extending around these in the form of a generally elongated helix. In that case the movable wheel may preferably be the lowermost wheel in one of said columns.

Preferably the endless conveyor means comprises a single endless conveyor. Movement of said movable guide means to vary the length of said path may be compensated for by corresponding movement of part of a return run of the conveyor. In a preferred construction said movable guide means and a further guide means in a return run of the endless conveyor means are moved together, e.g. by mounting them both on a common movable member. Means may be provided for adjustment of the distance between said guide means and said further guide means as a convenient way of adjusting length of the endless conveyor. Such means may readily be adapted to control tension of the endless conveyor by providing for said further guide means to be resiliently mounted relative to said common movable member. The resilient means may be associated with a suitable transducer for providing an output signal indicative of relative position of the further guide means and/or tension in the conveyor.

The various aspects of the invention may be used in combination, and may be incorporated in common apparatus.

Figure 2:
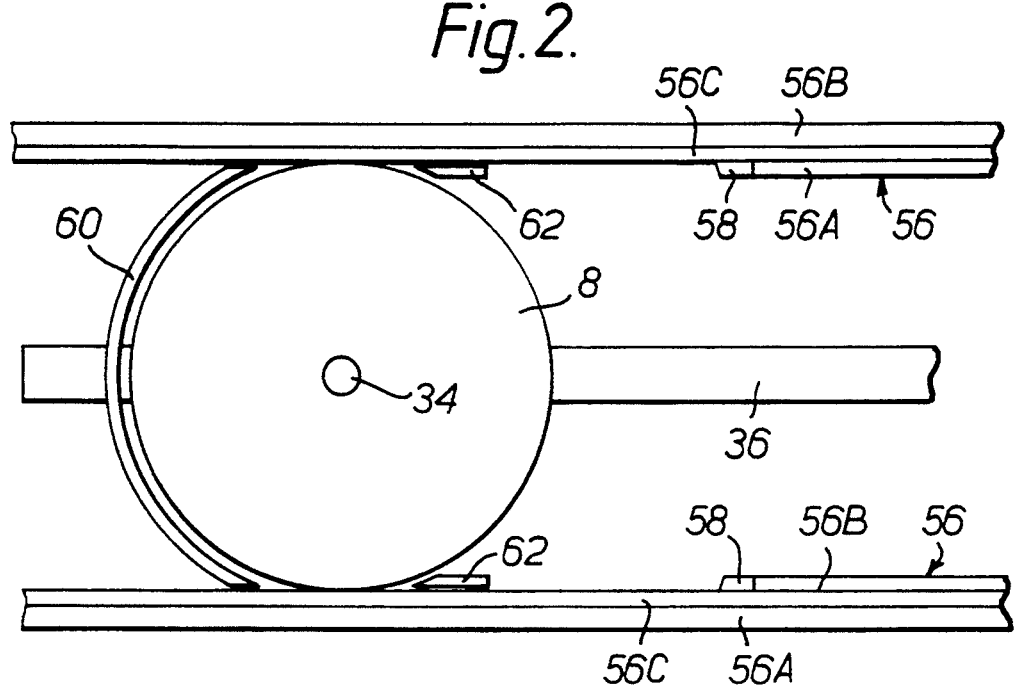
Figure 3:
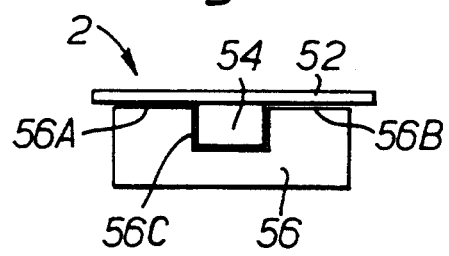
Figure 4:
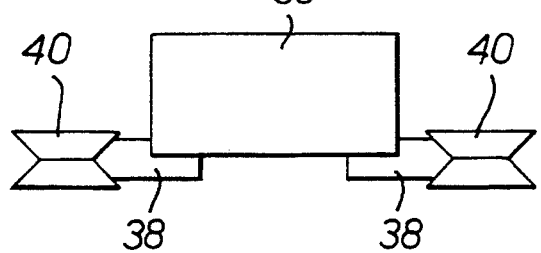
Figure 5:
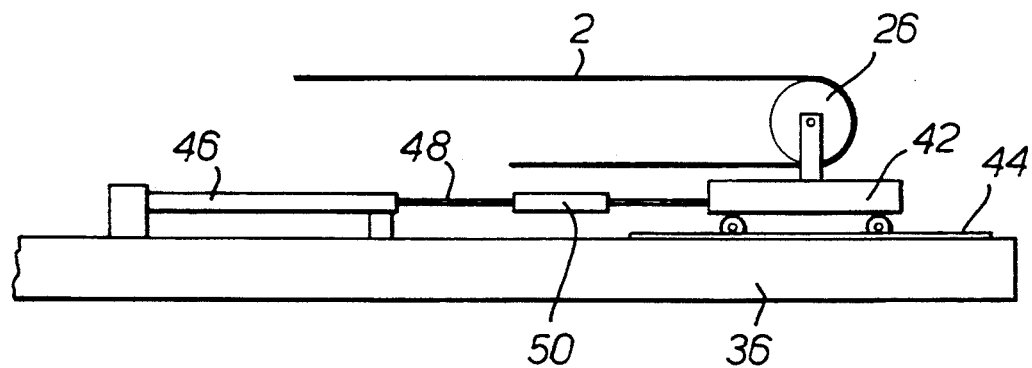
Figure 6:
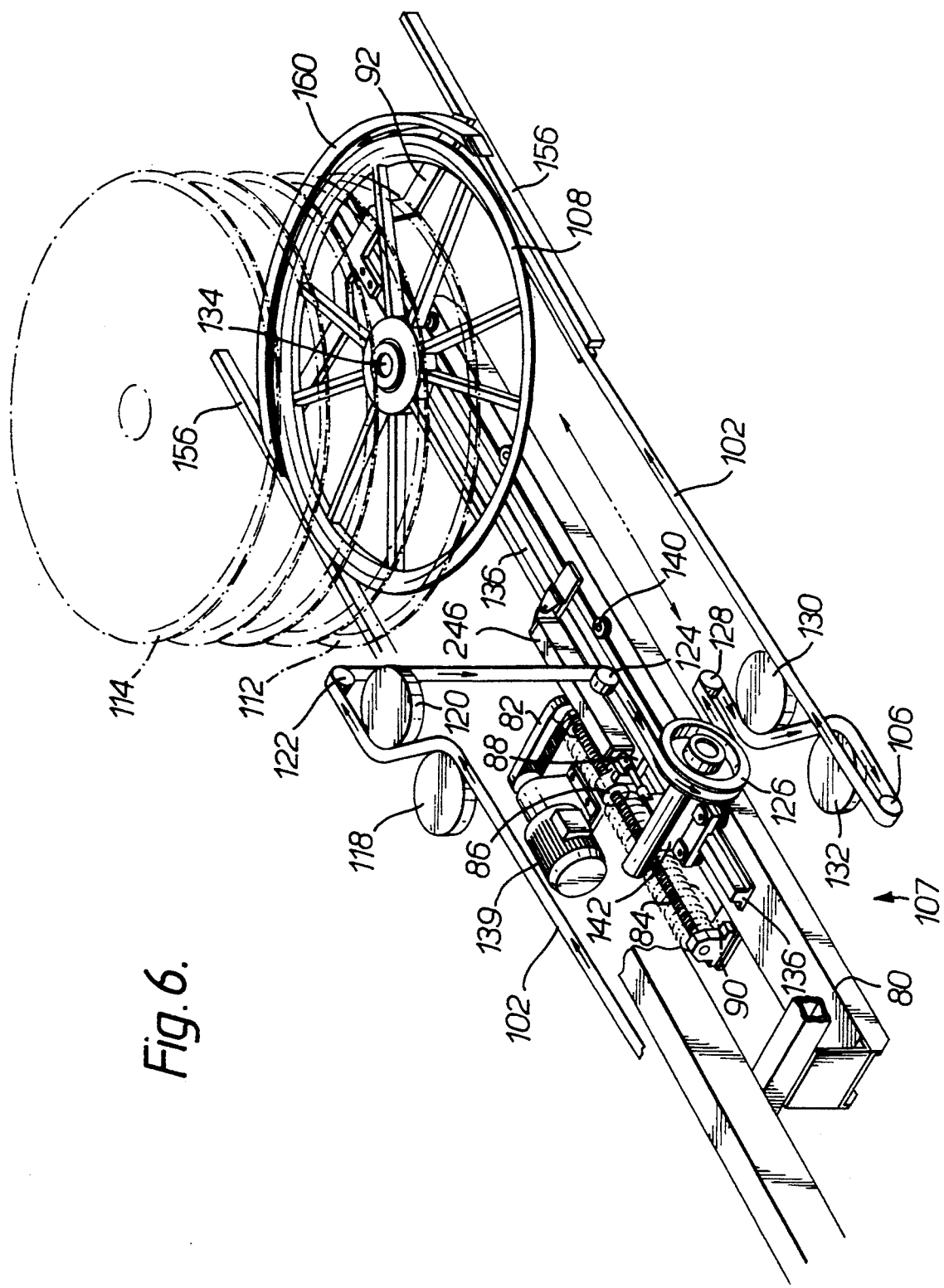

The invention will be further described, by way of example only, with reference to the accompanying diagrammatic drawings, in which FIG. 1 is a perspective schematic view of a reservoir for cigarettes, FIG. 2 is a plan view of part of the reservoir of FIG. 1, FIG. 3 is a cross-sectional view of a conveyor and support guide for the reservoir of FIG. 1, FIG. 4 is a cross-sectional view of a support beam of the reservoir of FIG. 1, FIG. 5 is an elevation of part of the reservoir of FIG. 1, showing the support beam, and FIG. 6 is a perspective view of another reservoir for cigarettes.

FIG. 1 shows a reservoir 1 including an endless support conveyor 2 for a multi-layer stream of cigarettes (not shown). The run of conveyor 2 which supports the cigarette stream extends from a position 4 at the top of a first pulley 6, rotatable about a horizontal axis, around a first wheel 8, rotatable about a vertical axis, to a second, spaced wheel 10. The support run of the conveyor 2 extends around the wheel 10 to a further wheel 12, located above the first wheel 8, and then to a further wheel above the wheel 10, and generally continues in this manner following an elongated helix up to an upper pair of wheels 14, 16, respectively located above the wheels 8 and 10. Typically there may be four or six vertically-spaced wheels at each end of the reservoir. The conveyor 2 has a return run extending from the upper wheel 16 around a number of pulleys 18-32 and hence back to the pulley 6.

The pulley 6 is located adjacent a junction 7, e.g. a T-junction in a mass flow conveyor system extending between a cigarette making machine and a cigarette packing machine, so that a continuous multilayer stream of cigarettes may be received on the conveyor 2 and be progressively conveyed into the reservoir 1 by movement of the conveyor 2. The leading end of the stream is bounded by an end wall (not shown) carried by the conveyor 2. When the end wall and the leading end of the stream reach the upper wheel 16 the reservoir is full. The conveyor 2 is reversible so that a stream may be delivered to the junction 7 from the reservoir 1. The construction and arrangement of the reservoir I so far described is substantially similar to the applicants' OSCAR reservoir and as described in the McCombie U.S. Pat. No. 4,339,025 assigned to the same assignee as this application to which reference is directed for further details. By way of further explanation, the conveyor 2 is supported on and driven by the wheels and is supported between the wheels by guides which are not shown in FIG. 1.

The form of the conveyor 2 may be substantially as disclosed in said McCombie patent, but could in principle comprise any laterally flexible conveyor capable of supporting a multi-layer stream of cigarettes. One suitable form of conveyor comprises a link conveyor with each link carrying a slat providing a support surface for cigarettes, the links being interconnected so as to allow relative movement about an axis perpendicular to as well as an axis parallel to the support surface; a conveyor of this type is available from SKF Handling Systems of S-415 50 Goteborg, Sweden under the designation Flex-Link.

The wheels 10 and 16 and the wheels between them rotate about a common fixed vertical axis and are connected to a motor 15 for common rotation of the wheels. Similarly the wheels 12 and 14 and the wheels between them rotate about a common fixed vertical axis and are connected to a motor 13. The motors 13 and 15 are electronically synchronized so that they provide a common drive for the conveyor 2. The wheel 8 is rotatable about a vertical spindle 34 which is carried by a rigid beam 36. The beam 36 is movable in a direction parallel to its length and, as shown in FIG. 4, for this purpose carries mountings 38 which cooperate with V-rollers 40 (not shown in FIG. 1). The mountings 38 and rollers 40 effectively form a slide for the beam 36 suitable components are available from Hepco Slide Systems Ltd of Greenford, Middlesex, UB6 7LA. Drive means (indicated at 39) is provided for moving and positioning the beam 36 relative to the rollers 40. Suitable forms of drive means are a rack and pinion, timing belt or recirculating ball.

The beam 36 is movable through a range of positions and carries a projection 64 which cooperates with a series of stationary proximity detectors 66, 68, 70 and 72, which span the range and are connected to the reservoir control system. In the position shown in FIG. 1 the beam 36 is in the centre of this range, with the spindle 34 of wheel 8 in axial alignment with the common axis of wheels 12 and 14.

As indicated in FIG. 1 and shown more particularly in FIG. 5, the beam 36 carries a pulley 26 in the return run of conveyor 2. Movement of the beam 36 in a direction to the left as shown in FIG. 1 results in an additional length of conveyor 2 being drawn into the operative run of the conveyor, because the lengths of the runs from pulley 6 to wheel 8 and from wheel 8 to wheel 10 are increased by the distance moved by the beam. This additional length is withdrawn from the return run of conveyor 2 by corresponding movement of the pulley 26 reducing the lengths of the runs between pulleys 24 and 26 and pulleys 26 and 28 by the distance travelled by the beam 36. Similarly, movement of the beam 36 in a direction to the right as shown in FIG. 1 causes a reduction in the length of the operative run of conveyor 2 which is compensated for by an increase in the length of the return run of the conveyor.

The axis of the pulley 26 is normally held in a fixed position relative to the beam 36. However, from time to time the conveyor 2 will require adjustment of its tension, particularly to compensate for length increases due to stretching. A convenient arrangement for achieving tension adjustment of the conveyor 2 is by movement of the position of the pulley 26 relative to the beam 36. As shown in FIG. 5, the pulley 26 is mounted on a carriage 42 which is movable along a track 44 mounted on the beam 36. The position of the carriage 42 on the track 44 is determined by a linear actuator 46 mounted on the beam 36. The linear actuator 46 is connected to the carriage 42 by an actuating rod 48 containing a linear transducer 50 which provides an output of the compressive force applied by the rod 48 to the carriage 42: this is effectively a measure of the tension applied to the conveyor 2 by the pulley 26. By linking the output from the linear transducer 50 to a PLC-controlled system which includes the linear actuator 46, it is thus possible to preset the required tension in the conveyor 2. Moreover, the transducer 50 can be arranged to supply a signal to the control system indicative of the position of the carriage. In this way the system is capable of storing and suitably displaying (e.g. on a monitor) the position of the carriage in relation to its limits of travel, so that warning may be given when the conveyor 2 needs to be shortened (e.g. due to excessive stretching) by removal of links or otherwise. At times other than when tension adjustment is being made the position of pulley 26 relative to the beam 36 is fixed (e.g. by clamping the carriage 42 to the beam).

As shown in FIG. 3, the conveyor 2 typically comprises a series of links each of which comprises a support surface 52 and a link connecting part 54. The conveyor 2 runs on a track 56 having support surfaces 56A, 56B for the edges of the surfaces 52 of the conveyor 2, and a recess 56C for accommodating and guiding the link-connecting parts 54.

FIG. 2 shows parallel tracks 56 leading from the region of the wheel 8. Because the wheel 8 is movable and is adapted to support the conveyor 2 with the outer periphery of the wheel engaging the inner periphery of the link-connecting parts 54, the track 56 is of reduced width along the path of the wheel. Thus the parts of the tracks 56 corresponding to regions beneath the surfaces 56A or 56B are missing along the path of the wheel. Where the tracks 56 become full-width again the appropriate parts of the track are provided with lead-in portions 58. The wheel 8 carries an arcuate support 60 for the radially-outer part of the support surfaces 52 of the conveyor 2 and also lead-in portions 62. The support 60 and parts 62 are movable with the beam 36 but do not rotate with the wheel 8.

Movement of the beam 36 in a direction to the left as shown in FIGS. 1 and 2 effectively increases the capacity of the reservoir: conversely movement of the beam to the right effectively decreases its capacity. When the reservoir 1 is used to buffer supply from one or more high speed cigarette making machines to one or more cigarette packing machines there may be relatively abrupt changes in operating conditions which require relatively rapid response from the reservoir if the system is to remain operating in an efficient manner. For example, if the making machine stops, a stream of cigarettes will usually be required to be delivered from the reservoir in order to maintain operation of the packing machine without slowing. Similarly, failure of a packing machine will require the reservoir to receive a stream of cigarettes if at least one cigarette making machine is not to be slowed or stopped. It will be appreciated that imposing sudden changes of speed or direction on a relatively large conveyor system such as that of the reservoir 1, with resultant high acceleration forces, is undesirable and may indeed be beyond the capacity of the structure and/or its drive means. It has already been proposed to provide in association with a relatively large reservoir, a smaller reservoir which receives or delivers cigarettes when the demand for speed change of the main reservoir exceeds a predetermined limit. Operation of the small reservoir in parallel with the main reservoir of itself assists in reducing the demands on the main reservoir: in addition, a small reservoir is generally capable of more rapid acceleration, when required, than a large reservoir. The small reservoir may effectively buffer the main reservoir by responding to shorter term variations in the supply and demand position of the system while longer term variations are handled by the main reservoir. In the case where a making or packing machine fails, although the small reservoir is necessarily of relatively low capacity it is able to deliver or receive cigarettes during the critical period while the main reservoir is accelerating up to the required speed. Subsequently the small reservoir may be returned to a preferred state of fill (e.g. half full).

Referring now again to FIGS. 1 and 2, when the beam 36 is moved in a direction to the left as viewed in FIG. 1 the lengths of the runs of conveyor 2 extending from the pulley 6 to the wheel 8 and from the wheel 8 to the wheel 10 increase. As previously mentioned, the increased conveyor length is supplied from the part of the conveyor passing around the pulley 26. Because the path length of the conveyor 2 from the pulley 26 to the run lying between the pulley 6 and the wheel 8 is very much shorter than that to the run lying between the wheels 8 and 10, and also because the latter run also passes around all of the remaining wheels and is therefore effectively locked against movement other than by drive means for the conveyor, transfer of conveyor to or from the runs around pulley 26 occurs substantially completely from or to the run between pulley 6 and wheel 8. Hence, the wheel 8 is caused to rotate in a clockwise direction (as viewed in FIGS. 1 and 2) as the beam 36 is moved to the left and in an anti-clockwise direction as it is moved to the right. As a consequence, when the beam 36 is moved through a distance D an additional length 2D of conveyor 2 is drawn into (or withdrawn from) the run lying between pulley 6 and wheel 8. It follows that when the beam 36 is moved at velocity V the additional velocity imposed on the length of conveyor lying between pulley 6 and wheel 8 is 2V.

When a sensor at the junction 7 adjacent the pulley 6 detects a surplus of cigarettes the beam 36 is moved in a direction to the left, either at a fixed rate or at a rate which is related to the extent of the surplus (depending on the nature of the sensor and the control system to which it is linked). As noted above, movement of the beam 36 at a given velocity moves the run of conveyor 2 between the pulley 6 and wheel 8 at twice that velocity. Clearly, this is helpful in providing a relatively rapid response to changes in conditions at the junction 7. If there continues to be a surplus at the junction 7 the beam 36 will reach a position corresponding to alignment of the projection 64 with the detector 68 at this position the drive for the conveyor 2 is started, i.e. the motors 13 and 15 are activated. Assuming the surplus at the junction 7 remains, the beam 36 continues to move to the left while the conveyor 2 accelerates up to its operating speed. The detector 66 is located at a position corresponding to the full extent of possible movement of the beam 36 to the left, and is located sufficiently distant from the detector 68 to allow the reservoir 1 to receive cigarettes at a predetermined maximum rate during the period while the conveyor 2 is accelerating. Once the beam 36 has moved through its maximum permissible distance to the left it may be returned to a median position at the earliest opportunity, possibly even while the surplus remains at the junction once the conveyor 2 is running at a high speed.

Movement of the beam 36 to the right, in the event that a deficiency is detected at the junction 7, is analogous to movement to the left. Thus, the four detectors 66-72 associated with the position of the beam 36 define "normal" and "outer" ranges of positions. In the normal range, corresponding to location of the projection 64 between the two inner detectors 68 and 70, the beam 36 moves to accommodate small surpluses or deficiencies at the junction 7, normally without the drive for the conveyor 2 being brought into operation. In the outer ranges, between the detectors 66 and 68 and 70 and 72 the drive to the conveyor 2 is brought into operation, with movement of the beam 36 in the outer ranges supplementing the flow due to the conveyor 2 itself while the latter is accelerating up to the required speed. The length of conveyor 2 lying between the pulley 6 and around wheel 8 effectively comprises a relatively small, variable capacity section of the reservoir, which provides a buffer for the main variable capacity part of the reservoir.

Although operation of the beam 36 has been described with reference to a sensor at junction 7, note that in the event that a maker or packer fails a signal may be received directly by the reservoir control system and movement of the beam 36 and conveyor 2 may then be initiated immediately, irrespective of the existing position of the beam.

The additional capacity required to be provided by movement of the wheel 8 may be determined by reference to the time taken by the reservoir conveyor 2 to run up to its full speed. Typically this might be 3 seconds to reach a rate equivalent to 16,000 cigarettes/minute. If the additional capacity provided by movement of the beam 36 between positions corresponding to movement of the projection 64 from detector 68 to 66 is equal to 3 seconds at 16,000 cigarettes/minute (i.e, 800 cigarettes) that will be more than sufficient because it ignores any superimposed movement of conveyor 2 as it is accelerating. Since 800 cigarettes occupy about 300 mm on a typical conveyor 2 the corresponding movement the beam 36 (to draw that length of conveyor into the run between pulley 6 and wheel 8) is 150 mm. Similarly, movement of the beam 36 between positions corresponding to the detectors 70 and 72 may be 150 mm. Conveniently, the distance between detectors 68 and 70 may be set at 300 mm, so that the total distance movable by the beam 36 and wheel 8 is about 600 mm, and the effective total capacity of the additional reservoir provided by movement of the wheel 8 is therefore about 3200 cigarettes or ± 1600 cigarettes on the nominal capacity of the reservoir 1. In a preferred form of the reservoir 1 the wheels 8–16 are 1200 mm in diameter and have centres horizontally spaced by 6000 mm; this gives a nominal capacity of about 130,000 cigarettes with six wheels at each end of the reservoir.

It will be appreciated that movement of the pulley 26 (or equivalent) to compensate for movement of the wheel 8 may be achieved in ways other than that shown in the drawings. Thus the pulley 26 need not be mounted on a common beam 36 but could be separately moved by means synchronized with the drive means for translating the wheel 8. In this case each may derive their movement from a common drive, e.g. operating through timing belts and a transmission (possibly including a clutch to allow independent movement of the pulley 26 and wheel 8 for tension adjustment of the conveyor 2). Another possibility would be to provide for movement of the wheel 8 to be compensated for by movement in the opposite direction of another of the reservoir wheels. Thus, the wheels 8 and 12 could be moved together in opposite directions by a rack and pinion or similar device arranged between the wheels. Such arrangements are necessarily more complex than the illustrated arrangement.

The reservoir of FIG. 6 is similar in construction and operation to that of FIG. 1; similar parts have been given similar reference numbers increased by 100 and have not been further described.

The V-rollers 140 which support the beam 136 and allow it to move longitudinally are themselves mounted on a stationary frame member 80.

The motor 139 for moving the beam 136 drives a timing belt 82 which in turn rotates a threaded rod 84. A follower member 86 engaging the threaded rod 84 is connected by way of a bracket 88 to the beam 36. The threaded rod 84 and follower 86 are enclosed in a protective rubber gaiter 90. The linear actuator 46 is replaced by a double acting pneumatic piston and cylinder 246, capable of setting and maintaining the position of the carriage 142. A mechanical latch (not shown) acting between the carriage 142 and the beam 136 resists undesired movement of the carriage in the direction towards the cylinder 246. The latch is automatically released when the piston and cylinder 246 is operated to move the carriage 142.

The arcuate support 160 is connected to a bracket 92 which is bolted to the beam 136 at a position near its end beyond the spindle 134 of wheel 108.

We claim:

1. A conveyor system for rod-like articles in multi-layer stack formation, comprising a reversible reservoir having first and second variable capacity sections arranged in series, conveyor means for conveying articles in each of said sections, and means for driving said conveyor means so that a continuous stack of articles may be conveyed at a given time at different rates in said first and second sections.

2. A conveyor system as claimed in claim 1, wherein the first section comprises means for storing a relatively small capacity of articles and the second section comprises means for storing a relatively large capacity of articles.

3. A conveyor system as claimed in claim 2, wherein the conveyor means extends continuously through said first and second sections.

4. A conveyor system as claimed in claim 3, wherein said driving means comprises a first means for driving the conveyor through the first and second sections, and a second means for imposing a supplementary drive in the first section.

5. A conveyor system as claimed in claim 1, including a plurality of guide means around which the conveyor means extends and means for moving at least one of the guide means to vary the capacity of at least the first section of the reservoir.

6. A conveyor system for rod-like articles, including means defining a path for said articles in multi-layer stack formation, a first variable capacity reservoir of relatively small capacity, a second variable capacity reservoir of relatively large capacity, said reservoirs being arranged so as to receive articles from or deliver articles to said path, and means for controlling transfer of articles to or from said reservoirs, said controlling means including means for effecting operation of said first reservoir alone, during non-operation of the second reservoir, to deliver articles to or receive articles from said path, whereby demands on operation of the second reservoir may be reduced, wherein the first and second reservoirs are arranged in series and are each of variable length.

7. A conveyor system as claimed in claim 6, wherein the system includes means defining a junction at which said path communicates with a first end of said first reservoir, the other end of said reservoir communicating with said second reservoir.

8. A conveyor system for rod-like articles, including means defining a path for said articles in multi-layer stack formation, a first variable capacity reservoir of relatively small capacity, a second variable capacity reservoir of relatively large capacity arranged in series with said first variable capacity reservoir, said reservoirs being arranged so as to receive articles from or deliver articles to said path, and means for controlling transfer of a continuous stack of articles to or from said reservoirs in such a way that said first reservoir is capable of operation alone or prior to the second reservoir, whereby demands on operation of the second reservoir may be reduced, and wherein each of said first and second reservoirs includes respective conveyor means, means being provided for driving said respective conveyor means at a given time at different linear speeds so that a continuous stack of articles may be conveyed at said given time in said first and second reservoirs at respectively different linear speeds.

9. A conveyor system for rod-like articles, including means defining a path for said articles in multi-layer stack formation, a first variable capacity reservoir of relatively small capacity, a second variable capacity reservoir of relatively large capacity, said reservoirs being arranged so as to receive articles from or deliver articles to said path, and means for controlling transfer of articles to or from said reservoirs, said controlling means being arranged so that said first reservoir is capable of operation alone or prior to the second reservoir, whereby demands on operation of the second reservoir may be reduced, wherein the first and second reservoirs are arranged in series, including common conveyor means extending through the first and second reservoirs, and means for moving said common conveyor means at different rates in the first and second reservoirs.

10. A conveyor system for rod-like articles, including a variable capacity reservoir having endless conveyor means for supporting a stream of rod-like articles in multi-layer stack formation, a plurality of spaced guide means defining a path of said conveyor means on which articles may be supported, and means for moving at least one of said guide means to move the conveyor means on part of said path without moving it on another part of said path.

11. A conveyor system as claimed in claim 10, wherein the movable guide means comprises a wheel around which said conveyor means passes, said moving means being arranged to move the wheel in a direction transverse to its axis.

12. A conveyor system as claimed in claim 10, wherein the reservoir comprises two horizontally spaced columns of vertically spaced wheels, the endless conveyor means extending around these in the form of a generally elongated helix.

13. A conveyor system as claimed in claim 12, wherein the movable wheel is the lowermost wheel in one of said columns.

14. A conveyor system as claimed in claim 10, wherein the endless conveyor means comprises an endless conveyor passing around said guide means.

15. A conveyor system as claimed in claim 14, including means for moving part of a return run of the conveyor to compensate for movement of said movable guide means to vary the length of said path.

16. A conveyor system as claimed in claim 14, including further guide means movable with said guide means, wherein said conveyor passes around said guide means and said further guide means in generally opposed loops, whereby movement of said guide means and said further guide means by said moving means results in increase in the length of one of said loops and corresponding decrease in the length of the other of said loops.

17. A conveyor system as claimed in claim 16, wherein said guide means and said further guide means are mounted on a common movable member.

18. A conveyor system as claimed in claim 16, wherein means is provided for adjusting the distance between said guide means and said further guide means.

19. A conveyor system as claimed in claim 18, wherein said adjusting means comprises means for tensioning said conveyor.

20. A conveyor system as claimed in claim 18, wherein the adjusting means includes a transducer for providing an output signal indicative of relative position of the further guide means.

21. A conveyor system as claimed in claim 18, wherein the adjusting means includes a transducer for providing an output signal indicative of tension in the conveyor.

22. A conveyor system for rod-like articles in a multi-layer stack formation, comprising a reversible reservoir having first and second variable capacity sections arranged in series, conveyor means for conveying articles in each of said sections, means for driving said conveyor means at respectively different rates in said first and second sections, and a plurality of spaced guide means around which the conveyor means extends in at least one of said first and second sections, said driving means including means for moving at least one of the guide means relative to another of said guide means so as to cause said conveyor means to be driven at said respectively different rates in said first and second sections.

* * * * *